United States Patent
Namou et al.

(10) Patent No.: US 9,601,812 B2
(45) Date of Patent: Mar. 21, 2017

(54) HIGH-VOLTAGE CONTACTOR SWITCHING SYSTEMS AND METHODS

(71) Applicant: GM GLOBAL TECHNOLOGY OPERATIONS LLC, Detroit, MI (US)

(72) Inventors: Andrew J. Namou, West Bloomfield, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 608 days.

(21) Appl. No.: 13/904,672

(22) Filed: May 29, 2013

(65) Prior Publication Data

US 2014/0356686 A1 Dec. 4, 2014

(51) Int. Cl.
*H01M 10/42* (2006.01)
*H01M 8/04* (2016.01)

(52) U.S. Cl.
CPC .......... *H01M 10/425* (2013.01); *H01M 8/04* (2013.01); *H01M 2220/20* (2013.01); *H01M 2250/20* (2013.01)

(58) Field of Classification Search
None
See application file for complete search history.

(56) References Cited

U.S. PATENT DOCUMENTS

| 2005/0099009 A1* | 5/2005 | Spellman | F02N 11/0851 |
| | | | 290/38 R |
| 2006/0043939 A1* | 3/2006 | Namuduri | H02P 9/305 |
| | | | 322/23 |
| 2010/0209748 A1* | 8/2010 | Kudo | H01M 10/425 |
| | | | 429/91 |

FOREIGN PATENT DOCUMENTS

| CN | 201396290 Y | 2/2010 |
| DE | 102011016056 A1 | 10/2012 |

OTHER PUBLICATIONS

DE102011016056A1—Machine Translation of application.
CN201396290Y—Machine Translation of application.

\* cited by examiner

*Primary Examiner* — Barbara Gilliam
*Assistant Examiner* — Adam A Arciero
(74) *Attorney, Agent, or Firm* — Phillips Ryther & Winchester; John P. Davis

(57) ABSTRACT

Systems and methods for switching high-voltage contactors in a battery system with reduced degradation over time are presented. In certain embodiments, a system may include solid-state switches disposed is parallel with the high-voltage contactors. The solid-state switches may be configured to selectively close when the high-voltage contactors are in transition from a closed state to an open state. By closing the solid-state switches during this transition, electrical arcing and associated degradation and/or damage to the contactors may be reduced.

15 Claims, 6 Drawing Sheets

HIGH-VOLTAGE CONTACTOR SWITCHING SYSTEMS AND METHODS

TECHNICAL FIELD

This disclosure relates to systems and methods for switching high-voltage contactors in a battery system. More specifically, the systems and methods of the present disclosure provide for high-voltage contactor switching with reduced degradation over time.

BACKGROUND

Passenger vehicles often include electric batteries for operating features of a vehicle's electrical and drivetrain systems. For example, in a hybrid-electric vehicle ("HEV"), a plug-in hybrid electric vehicle ("PHEV"), a fuel cell electric vehicle ("FCEV"), or a purely electric vehicle ("EV"), an energy storage system ("ESS") (e.g., a rechargeable ESS) may be used to power electric drivetrain components of the vehicle (e.g., electric drive motors and the like). The ESS may store high-voltage electrical energy, which may be transmitted to vehicle systems via a high-voltage ("HV") bus having positive and negative conductors or rails. The ESS may be selectively coupled to the positive and negative conductors or rails via one or more selectively switched electric contactors. Due to the HV electrical energy provided by the ESS system, however, such electric contactors may degrade over time.

SUMMARY

Systems and methods are presented for switching HV contactors in a battery system with reduced degradation over time. In certain embodiments, a system for switching HV contactors in a battery system may include a primary contactor configured to selectively couple a positive terminal of the battery system to a primary rail and a secondary contactor configured to selectively couple a negative terminal of the battery system to a secondary rail. The system may further include a primary solid-state switch configured to selectively couple the positive terminal to the primary rail when the primary contactor is in transition from a closed state to an open state and a secondary solid-state switch configured to selectively couple the negative terminal to the secondary rail when the secondary contactor is in transition from the closed state to the open state.

In certain embodiments, the systems disclosed herein may include a primary contactor relay driver configured to actuate the primary contactor and a secondary contactor relay driver configured to actuate the secondary contactor. The system may further include a primary monostable triggered circuit (e.g., a monostable multivibrator circuit) coupled to an output of the primary contactor relay driver. A primary solid-state switch driving circuit may be coupled to an output of the primary monostable triggered circuit and be configured to selectively actuate the primary solid-state switch based on a signal derived from the output of the primary contactor relay driver.

Further embodiments of the systems disclosed herein may include a secondary monostable triggered circuit (e.g., a monostable multivibrator circuit) coupled to an output of the secondary contactor relay driver. The secondary solid-state switch driving circuit may be coupled to an output of the secondary monostable triggered circuit and be configured to selectively actuate the secondary solid-state switch based on a signal derived from the output of the secondary contactor relay driver.

In further embodiments, a method for switching HV contactors in a battery system may include generating a first signal configured to open an electrical relay in a contactor. In response to the first signal, an electrical relay in the contactor may be opened. A second signal may be generated configured to close a solid-state switch disposed in parallel to the contactor. The solid-state switch may be closed in response to the second signal. After determining that the electrical relay in the contactor is open, the solid-state switch may be opened.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

The systems and methods disclosed herein may provide for HV contactor switching of an ESS with reduced contactor degradation over time. Particularly, the systems and methods disclosed herein may reduce degradation of electrical contactors over time attributable to, among other things, electrical arcing across relay contacts of the contactors. Consistent with embodiments disclosed herein, a solid-state switch may be disposed in parallel with an HV contactor. When switched on, the solid-state switch may limit (e.g., clamp) the voltage across the relay contacts of the HV contactor. In certain embodiments, this may reduce electrical arcing as the mechanical relay contacts open. As contacts of mechanical relay of the contactor open, current through the mechanical relay may be shunted through the solid-state switch. Once sufficient time elapses for the mechanical relay contacts of the contactor to fully open, the solid-state switch may be turned off. By shunting current through the solid-state switch and limiting the voltage while the relay contacts of the contactor are opening, damage and/or degradation to the contacts (e.g., caused by electrical arcing) may be reduced.

Figure 1:
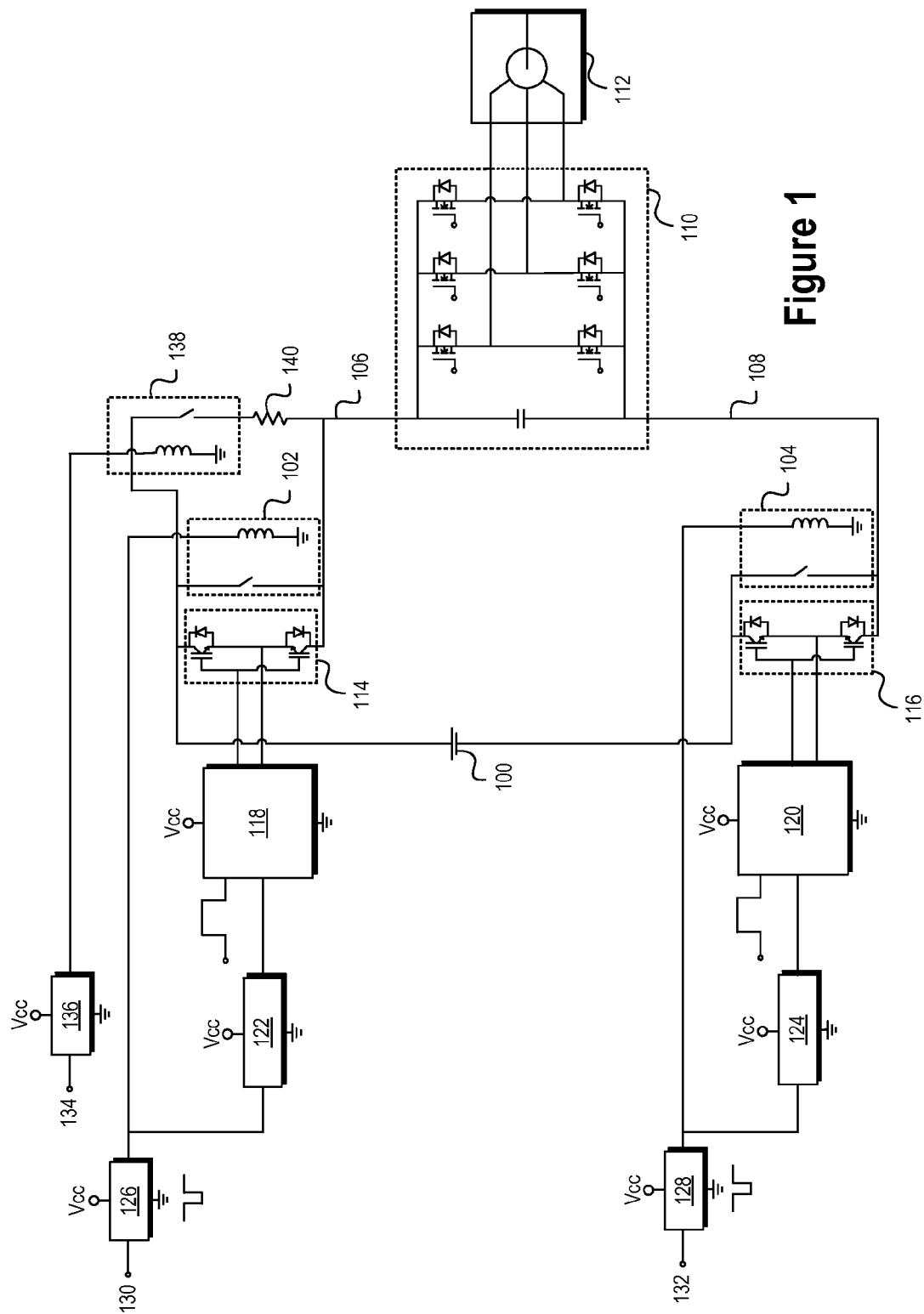
FIG. 1 illustrates an exemplary system for switching high-voltage contactors in a battery system consistent with embodiments disclosed herein.

FIG. 1 illustrates an exemplary system for switching HV contactors 102, 104 in an ESS 100 consistent with embodiments disclosed herein. The ESS 100 may provide electrical power to one or more electric motors 112 and/or other systems included in a vehicle. In certain embodiments, the one or more electric motors 112 may comprise one or more permanent magnet synchronous motors ("PMSMs"), induction motors, permanent magnet synchronous reluctance motors, switched reluctance motors, asynchronous motors, and/or any other types of AC motors included in a vehicle's drivetrain.

The ESS 100 may include one or more battery packs and/or battery cells (not shown) suitably sized to provide electrical power to vehicle systems utilizing any suitable battery technology or combination thereof. Suitable battery technologies may include, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other suitable battery technologies. In some embodiments, the ESS 100 may be a HV ESS.

The ESS 100 may store HV electrical energy that may be provided to vehicle systems via a HV bus having primary and secondary conductors or rails 106, 108 (e.g., primary and secondary rails). The primary rail 106 may be selectively coupled to a positive terminal of the ESS 100 by a primary contactor 102 comprising, for example, a solenoid driven switch. Similarly, the secondary rail 108 may be selectively coupled to a negative terminal of the ESS 100 by a secondary contactor 104 comprising, for example, a solenoid driven switch. Electrical power provided by the ESS 100 to the primary and secondary rails 106, 108 may in turn be provided to a power inverter system 110. The power inverter system 110 may be coupled to the AC electric motor 112, thereby delivering electric power from the ESS 100 to the electric motor 112 when the primary and secondary contactors 102, 104 are closed. Although the illustrated embodiments include one power inverter system 110 and one AC electric motor 112, any suitable number of electric motors and/or inverters may be utilized consistent with embodiments disclosed herein.

In some embodiments, the ESS 100 may utilize a pre-charging contactor 138 comprising a solenoid driven switch during pre-charging operations of the ESS 100. When actuated by a pre-charging contactor relay driver 136 (e.g., based on a pre-charge control signal 134), the pre-charging contactor 138 may couple a positive terminal of the ESS 100 to the primary rail 106 through a pre-charge resistor 140. A secondary contactor relay driver 128 may cause the secondary contactor 104 to couple a negative terminal of the ESS 100 to the secondary rail 104. The secondary contactor 104 may be selectively actuated by a secondary contactor relay driver 128 based on a secondary contactor control signal 132.

The pre-charge resistor 140 may be suitably configured to provide a relatively slow charging of a capacitance of a load (e.g., power inverter system 110 and/or electric motor 112) coupled across the primary and secondary rails 106, 108 when the pre-charging contactor 138 and the secondary contactor 104 are closed. After the capacitance of a load coupled across the primary and secondary rails 106, 108 reaches a predetermined level (e.g., a stable level) and/or after a predetermined period of time, the primary contactor 102 may be closed and the pre-charging contactor 138 may be opened. Similar to the secondary contactor 104, the primary contactor 102 may be selectively actuated by a primary contactor relay driver 126 based on a primary contactor control signal 130.

Consistent with embodiments disclosed herein, a primary solid-state switch 114 may be disposed in parallel with the primary contactor 102. In certain embodiments, the primary solid-state switch 114 may have bi-directional blocking capability provided by one or more opposing diodes included in the primary solid-state switch 114. As illustrated, the solid-state switch 114 may comprise a pair of transistors (e.g., insulated-gate bipolar transistors ("IGBTs"), Silicon Carbide, low-saturation silicon, wide-band gap, gallium nitride and/or other suitable types of metal-oxide-semiconductor field-effect transistors ("MOSFETs"), bi-polar junction transistor ("BJTs"), junction gate field-effect transistors ("JFETs"), and/or the like) connected in series. In certain embodiments, the pair of transistors included in the solid-state switch 114 may be connected in series opposition with emitter terminals electrically connected together and gate terminals electrically connected together so that the transistors may be turned on or off by a common electrical output of a driving circuit. The pair of transistors may be disposed parallel to the blocking diodes. In some embodiments, the transistors included in the primary solid-state switch 114 may be configured to operate in a saturated region.

The primary solid-state switch 114 may be driven by a primary solid-state switch driving circuit 118 (e.g., gate drive circuitry) that, in certain embodiments, may be isolated. The primary solid-state switching driving circuit 118 may be driven by a primary monostable triggered circuit 122 (e.g., a monostable multivibrator circuit) operating on an edge signal derived from the output of the primary contactor relay driver 126. As illustrated in FIG. 1, certain of the illustrated circuit components may be configured to operate on an active high ("AH") logic state. In certain embodiments, the primary monostable triggered circuit 122 may comprise a 75121 logic-based circuit, a 555 analog timer-based integrated circuit, a CD4098B CMOS-base monostable multivibrator circuit, and/or the like.

A secondary solid-state switch 116 may be similarly disposed in parallel with the secondary contactor 104. In certain embodiments, the secondary solid-state switch 116 may include similar constituent components as primary solid-state switch 114. Like the transistors of the primary solid-state switch 114, transistors included in the secondary solid-state switch 116 may be configured to operate in a saturated region. The secondary solid-state switch 116 may be driven by a second solid-state switch driving circuit 120. The secondary solid-state switching driving circuit 122 may be driven by a secondary monostable triggered circuit 124 (e.g., a monostable multivibrator circuit) operating on an edge signal derived from the output of the secondary contactor relay driver 128. In certain embodiments, the secondary monostable triggered circuit 124 may comprise a 75121 logic-based circuit, a 555 analog timer-based integrated circuit, a CD4098B CMOS-based monostable multivibrator circuit, and/or the like.

In the event of a HV disconnect of the ESS 100, the primary contactor 102 and the secondary contactor 104 may be driven by the primary and secondary contactor relay drivers 126, 128 respectively to disconnect the ESS 100 from the primary and secondary rails 106, 108. The signal output by the primary contactor relay driver 126 may be provided to the primary monostable triggered circuit 122 which in turn may trigger the primary solid-state switching driving circuit 118 to close the primary solid-state switch 114. Closing primary solid-state switch 114 may limit the voltage across the contacts of the primary contactor 102. As the electrical contacts of the relay included in the primary contactor 102 opens, the resistance across its contacts may increase to infinity and current previously flowing through the primary contactor 102 may be shunted across the primary solid-state switch 114. Once sufficient time elapses for the electrical contacts of the relay of the primary contactor 102 to fully open, the primary solid-state switch 114 may be turned off (e.g., as determined by the time duration of a pulse generated by the monostable circuit 122). By shunting current through the primary solid-state switch 114 until the contacts of the relay of the primary contactor 102 are open, electrical arcing across the contacts during opening and associated wear and/or damage to the primary contactor 102 may be reduced.

The secondary solid-state switch 116 may operate similarly. For example, in the event of a high-power disconnect of the ESS 100, the secondary contactor 104 may be driven by the secondary contactor relay driver 128 to disconnect the ESS 100 from the secondary rail 108. The signal output by the secondary contactor relay driver 128 may be provided to the secondary monostable triggered circuit 124 which in turn may trigger the secondary solid-state switching driving circuit 120 to close the secondary solid-state switch 116. Closing the secondary solid-state switch 116 may clamp the voltage across the contacts of the secondary contactor 104. As the electrical contacts of the relay included the secondary contactor 104 open, the resistance across its contacts may increase to infinity and current previously flowing through the secondary contactor 104 may be shunted through the secondary solid-state switch 116. Once sufficient time elapses for the electrical contacts of the relay of the secondary contactor 104 to fully open, the secondary solid-state switch 116 may be turned off (e.g., as determined by the time duration of the pulse generated by the monostable circuit 124). By shunting current through the secondary solid-state switch 116 until the contacts of the relay of the secondary contactor 104 are open, electrical arcing across the contacts during opening and associated wear and/or damage to the secondary contactor 104 may be reduced.

In certain embodiments, utilizing primary and secondary solid-state switches 114, 116 in parallel with primary and secondary contactors 102, 104 respectively may allow for the use of primary and secondary contactors 102, 104 of a reduced size, and/or cost. Further, the systems and methods disclosed herein may allow for primary and secondary contactor 102, 104 to hot switch a greater number of cycles or higher power than that of a conventional HV contactor system. In addition, the systems and methods decrease packaging space for battery bulkhead disconnect units ("BBDU"), reduce contactor noise, vibration, and harshness ("NVH"), increase contactor cycle life, and reduce failures associated with degraded electrical contacts associated with hot switching cycles (e.g., electrical arcing). In some embodiments, systems and methods disclosed herein may utilize existing controls included in a contactor system (e.g., signals provided by a primary and/or secondary contactor relay driver 126, 128).

Figure 2:
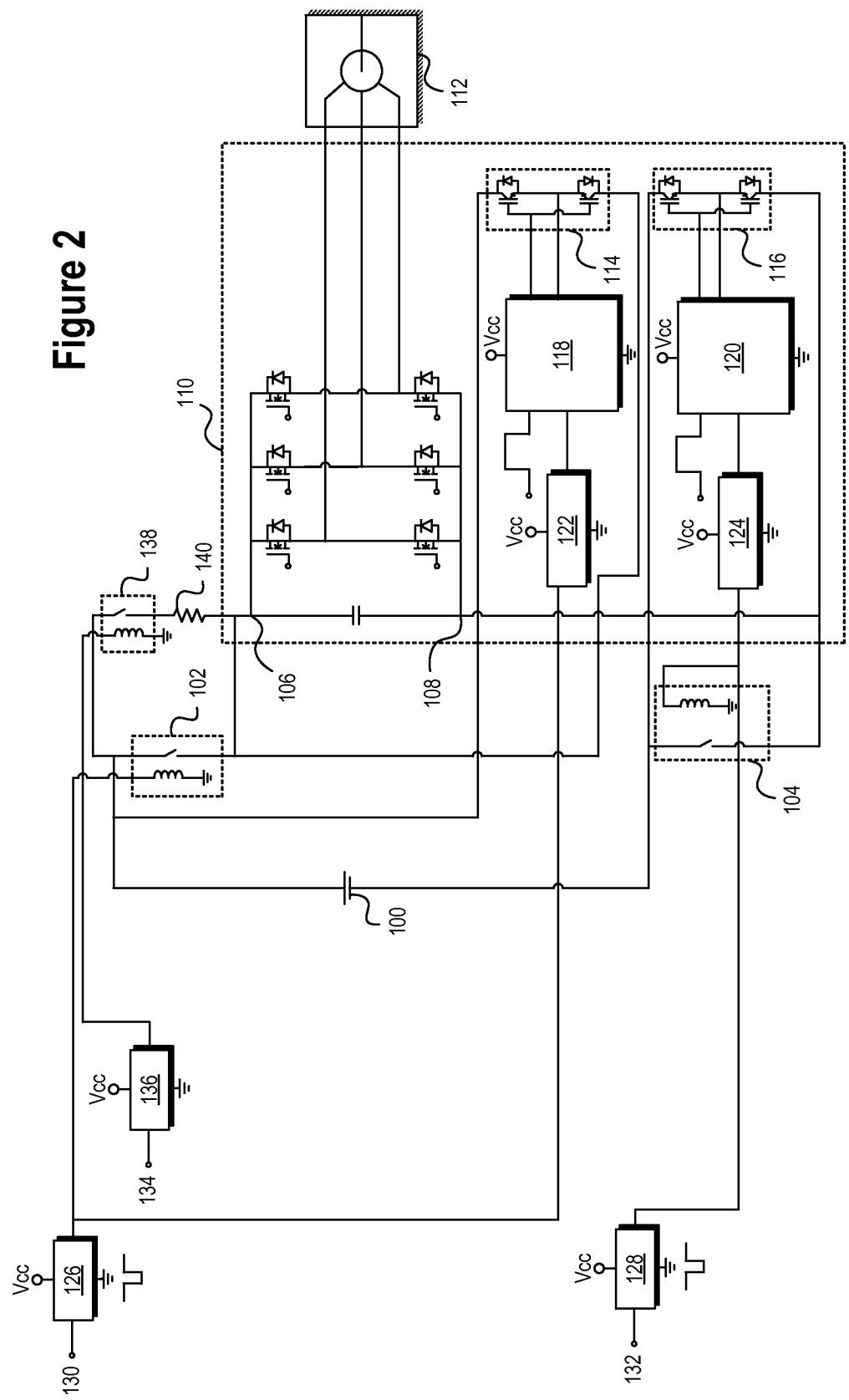
FIG. 2 illustrates another exemplary system for switching high-voltage contactors in a battery system consistent with embodiments disclosed herein.

FIG. 2 illustrates another exemplary system for switching HV contactors 102, 104 in an ESS 100 consistent with embodiments disclosed herein. The constituent components of the system illustrated in FIG. 2 may be similar to the components illustrated and described above in reference to FIG. 1. In certain embodiments, the primary and secondary solid-state switches 114, 116 and associated components may be part of an inverter system 110. Accordingly, as illustrated, primary and secondary monostable triggered circuits 122, 124, primary and secondary solid-state switching driving circuits 128, 126, and primary and secondary solid-state switches 114, 116 may be included as part of the inverter system 110.

Figure 3:
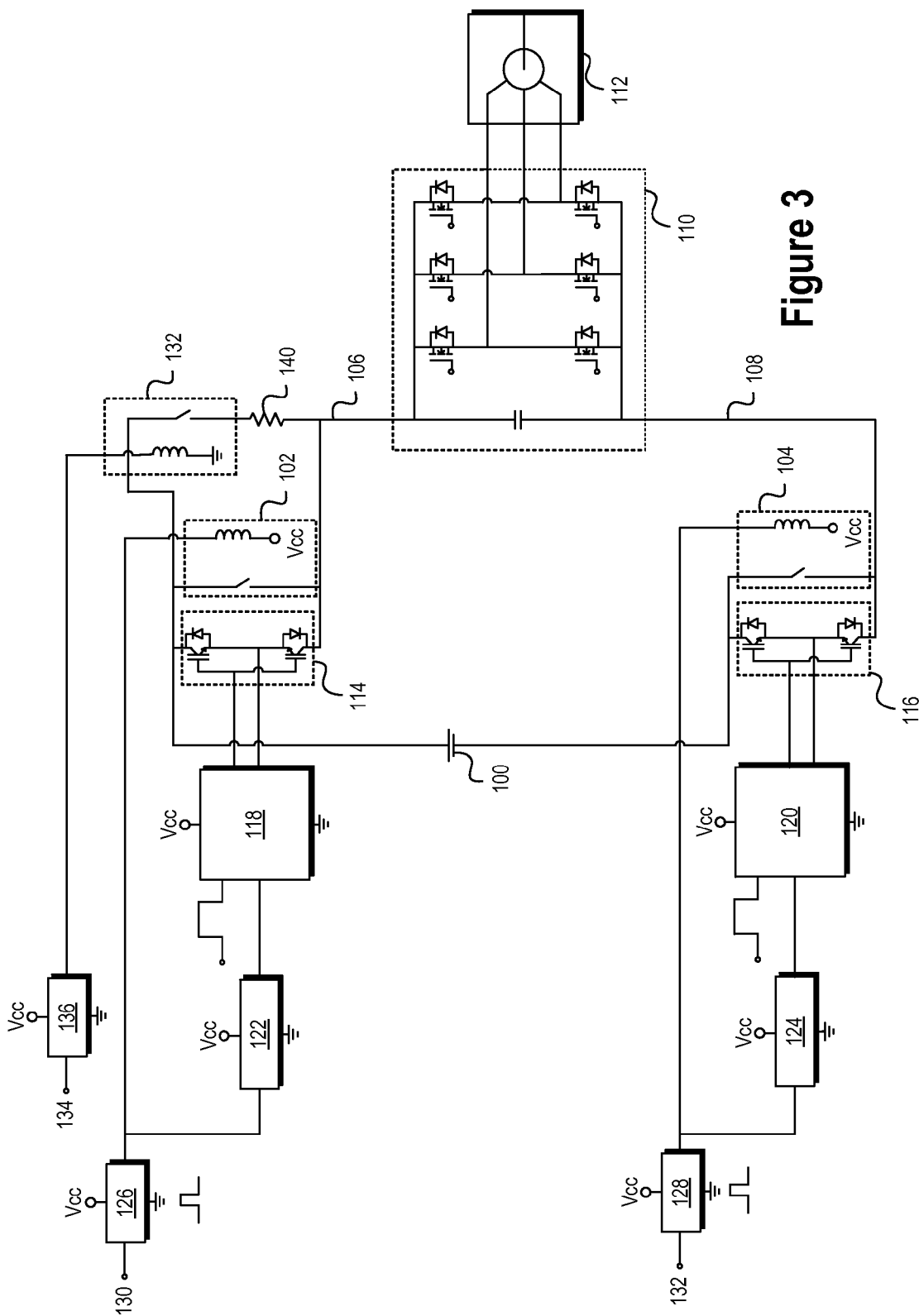
FIG. 3 illustrates a further exemplary system for switching high-voltage contactors in a battery system consistent with embodiments disclosed herein.

FIG. 3 illustrates a further exemplary system for switching HV contactors 102, 104 in an ESS 100 consistent with embodiments disclosed herein. The constituent components of the system illustrated in FIG. 3 may be similar to the components illustrated and described above in reference to FIG. 1. Certain of the circuit components of the system illustrated in FIG. 3, however, may be configured to operate on an active low ("AL") logic state.

Figure 4:
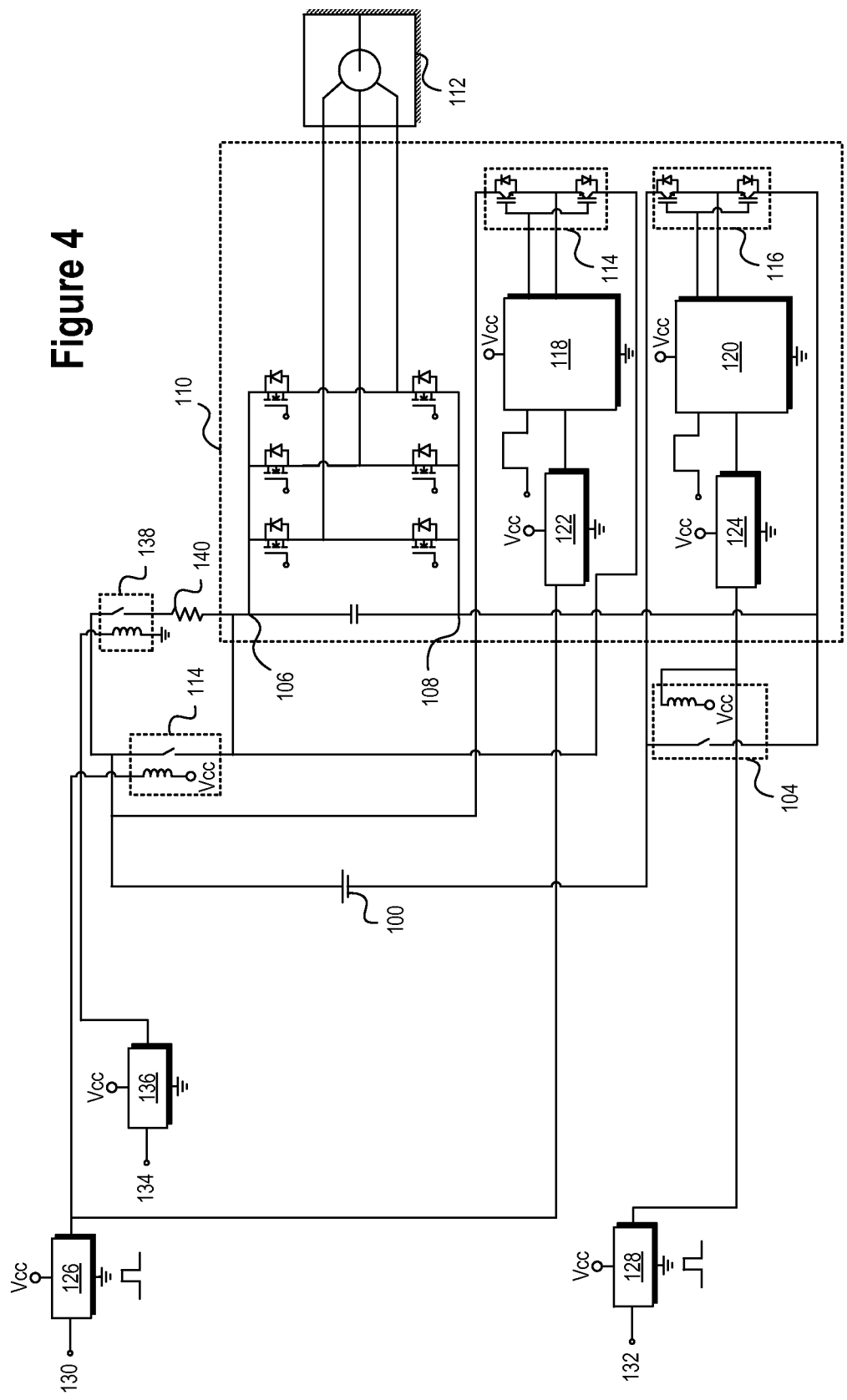
FIG. 4 illustrates an additional exemplary system for switching high-voltage contactors in a battery system consistent with embodiments disclosed herein.

FIG. 4 illustrates an additional exemplary system for switching HV contactors 102, 104 in an ESS 100 consistent with embodiments disclosed herein. The constituent components of the system illustrated in FIG. 4 may be similar to the components illustrated and described above in reference to FIG. 2. For example, as illustrated, primary and secondary monostable triggered circuits 122, 124, primary and secondary solid-state switching driving circuits 128, 126, and primary and secondary solid-state switches 114, 116 may be included as part of an inverter system 110. Like the system illustrated in FIG. 3, certain components of the system illustrated in FIG. 4 may be configured to operate on an AL logic state.

Figure 5:
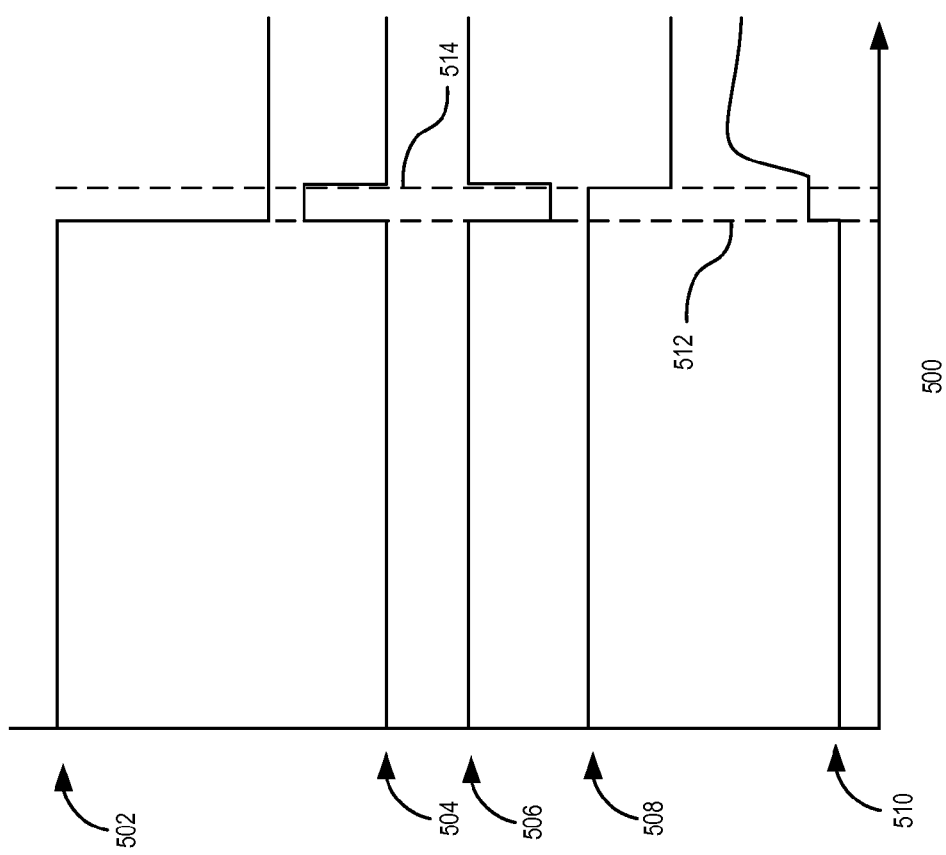
FIG. 5 illustrates an exemplary timing diagram consistent with embodiments disclosed herein.

FIG. 5 illustrates an exemplary timing diagram consistent with embodiments disclosed herein. Particularly, FIG. 5 illustrates an exemplary output signal from a contactor relay driver 502, a solid-state switch driving circuit output signal 504 operating on a AH logic state, a solid-state switch driving circuit output signal 506 operating on an AL logic state, a binary indication of a position of relay contacts in a contactor 508 (e.g., open/closed), and a voltage signal 510 across a contactor over time 500. As illustrated, at time 512, the output signal 502 from a contactor relay driver may drive a relay in a contactor to open. In turn, this may cause solid-state switching driving circuit to output a signal to close an associated solid-state switch (e.g., signal 504 if operating on an AH logic state or signal 506 if operating on an AL logic state). As the position of the relay contacts in the contactor 508 switches from closed to open, the voltage across the contactor 510 may be clamped until the relay contacts are fully open. After the position of the relay contacts in the contactor are open (i.e., fully open) at time 514, the output of the solid-state switch driving circuit 504, 506, may cause the associated solid-state switch to open, thereby causing the voltage across the contactor 510 to increase to a stable state associated with an open relay (i.e., an open circuit voltage).

Figure 6:
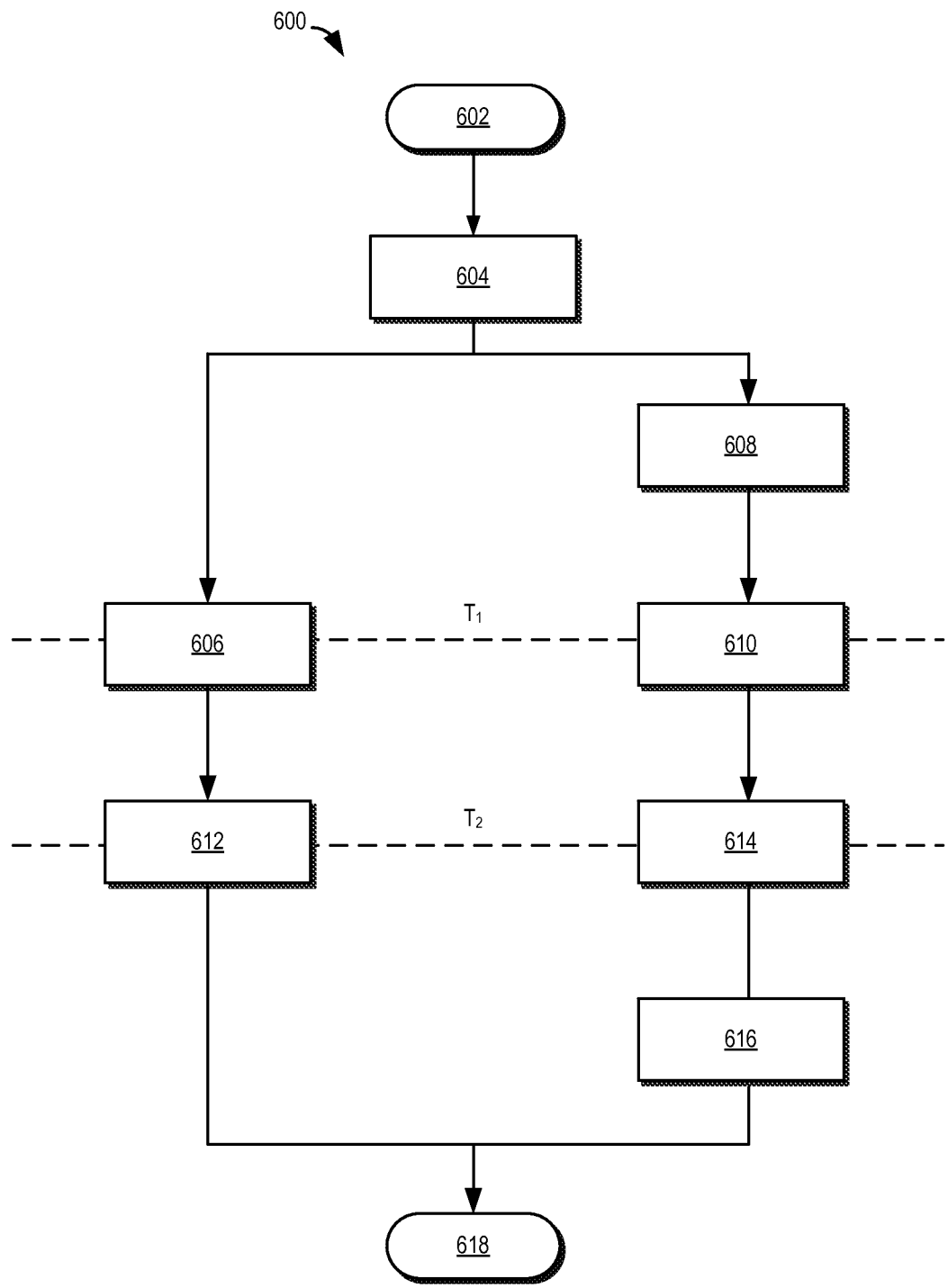
FIG. 6 illustrates a flow chart of an example of a method for switching a high-voltage contactor consistent with embodiments disclosed herein.

FIG. 6 illustrates a flow chart of an example of a method 600 for switching a HV contactor consistent with embodiments disclosed herein. In certain embodiments, the illustrated method 600 may be performed using, at least in part, a contactor relay driver, a contactor, a monostable triggering circuit, a solid-state switch driving circuit, and a solid-state switch as disclosed herein. In further embodiments, any other suitable system or systems may be utilized.

At 602, the method may be initiated. At 604, a driving signal configured to cause relay contacts of a contactor to open may be generated. In response to the driving signal, the relay contacts may begin to open 606 at a time $T_1$. Based on the driving signal, a signal causing a solid-state switch disposed in parallel to the contactor to close may be generated at 608. In response to this signal, the solid-state switch may close 610 at time prior to $T_1$. After the relay contacts are fully open at 612 a time $T_2$, a signal causing the solid-state switch to open may be generated 614 after time $T_2$ as predetermined by the monostable timing circuit. In response to this signal, the solid-state switch may open 616. With both the contactor and the solid-state switches in open configurations, the method may terminate at 618.

Although the foregoing has been described in some detail for purposes of clarity, it will be apparent that certain changes and modifications may be made without departing from the principles thereof. Certain features of the embodiments disclosed herein may be configured and/or combined in any suitable configuration or combination. Additionally, certain systems and/or methods disclosed herein may be utilized in battery systems and/or ESS systems not included in a vehicle (e.g., a backup power battery system or the like). It is noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. Various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A system comprising:
   a primary contactor configured to selectively couple a positive terminal of a battery system to a primary rail;
   a primary contactor relay driver configured to actuate the primary contactor;
   a primary monostable triggered circuit coupled to an output of the primary contactor relay driver;
   a secondary contactor configured to selectively couple a negative terminal of the battery system to a secondary rail;
   a secondary contactor relay driver configured to actuate the secondary contactor;
   a primary solid-state switch configured to selectively couple the positive terminal to the primary rail when the primary contactor is in transition from a first state to a second state;
   a primary solid-state switch driving circuit coupled to an output of the primary monostable triggered circuit configured to selectively actuate the primary solid-state switch based on a signal derived from the output of the primary contactor relay driver; and
   a secondary solid-state switch configured to selectively couple the negative terminal to the secondary rail when the secondary contactor is in transition from the first state to the second state.

2. The system of claim 1, wherein the first state comprises a closed state and the second state comprises an open state.

3. The system of claim 1, wherein the primary monostable triggered circuit comprises a monostable multivibrator circuit with an output of predetermined pulse duration.

4. The system of claim 1, wherein the system further comprises:
   a secondary monostable triggered circuit coupled to an output of the secondary contactor relay driver; and
   a secondary solid-state switch driving circuit coupled to an output of the secondary monostable triggered circuit configured to selectively actuate the secondary solid-state switch based on a signal derived from the output of the secondary contactor relay driver.

5. The system of claim 4, wherein the secondary monostable triggered circuit comprises a monostable multivibrator circuit with an output of predetermined pulse duration.

6. The system of claim 1, wherein the primary solid-state switch comprises a first plurality of switching transistors and the secondary solid-state switch comprises a second plurality of switching transistors.

7. The system of claim 6, wherein the first and second pluralities of switching transitions each comprise at least one insulated-gate bipolar transistor.

8. The system of claim 1 further comprising a power inverter system coupled to the primary rail and the secondary rail.

9. The system of claim 8, wherein the power inverter system is configured to provide electrical power to an electric motor.

10. The system of claim 8, wherein the primary solid-state switch and the secondary solid-state switch are included in the inverter system.

11. The system of claim 1, wherein the primary solid-state switch and the secondary solid-state switch are configured to provide bi-directional signal blocking.

12. The system of claim 11, wherein the primary solid-state switch comprises a first plurality of diodes configured to provide bi-directional signal blocking and the secondary solid-state switch comprises a second plurality of diodes configured to provide bi-directional signal blocking.

13. A system comprising:
- a primary contactor driver configured to actuate a primary contactor configured to selectively couple a positive terminal of a battery system to a primary rail;
- a primary monostable triggered circuit coupled to an output of the primary contactor driver:
- a secondary contactor driver configured to actuate a secondary contactor configured to selectively couple a negative terminal of the battery system to a secondary rail;
- a primary solid-state switch driving circuit configured to selectively actuate a primary solid-state switch configured to selectively couple the positive terminal to the primary rail when the primary contactor is in transition from a first state to a second state based on a signal derived from the output of the primary contactor driver; and
- a secondary solid-state switch driving circuit configured to selectively actuate a secondary solid-state switch configured to selectively couple the negative terminal to the secondary rail when the secondary contactor is in transition from the first state to the second state.

14. The system of claim 13, wherein the first state comprises a closed state and the second state comprises an open state.

15. The system of claim 13, wherein the system further comprises the battery system.

* * * * *